Figure 1:
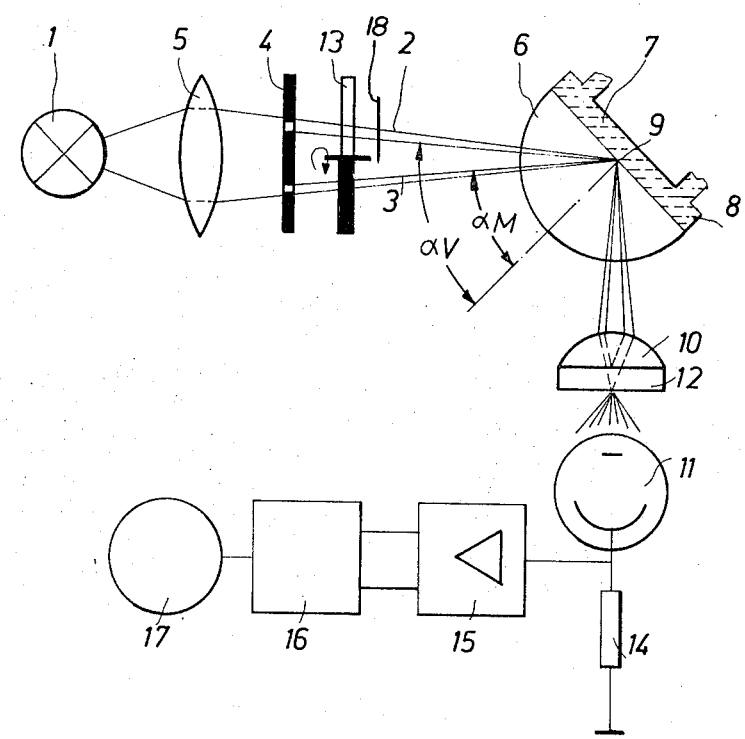

United States Patent

Grässel et al.

[15] 3,650,631

[45] Mar. 21, 1972

[54] ARRANGEMENT AND PROCESS FOR MEASURING THE REFRACTIVE INDEX OF LIQUIDS

[72] Inventors: Joachim Grässel, Krefeld-Bockum; Otto Petersen, Krefeld, both of Germany

[73] Assignee: Farbenfabriken Bayer Aktiengesellschaft, Leverkusen, Germany

[22] Filed: Apr. 30, 1970

[21] Appl. No.: 33,452

[30] Foreign Application Priority Data

May 13, 1969 Germany ..................... P 19 24 311.9

[52] U.S. Cl. ............................................ 356/128, 356/136
[51] Int. Cl. ........................................................ G01r 21/46
[58] Field of Search ........................................... 356/128–137

[56] References Cited

UNITED STATES PATENTS 2,885,923   5/1959   Simmons ............................. 356/136
2,445,499   7/1948   Silge .................................... 356/135

Primary Examiner—Ronald L. Wibert
Assistant Examiner—Conrad Clark
Attorney—Burgess, Dinklage & Sprung

[57] ABSTRACT

A two-beam arrangement for measuring the refractive index of liquids using the fact that the intensity of a measuring light beam reflected at an interface between a solid reference body and a sample liquid is governed by the refractive index of the sample liquid when the angle of incidence of the light beam striking the interface is smaller than the critical angle of total reflection, in which arrangement the measuring beam and comparison beam are reflected at the same point along an interface between a measuring liquid sample and a reference body, the angle of incidence of the measuring beam being smaller and the angle of incidence of the comparison beam being greater than the critical angle of total reflection.

12 Claims, 2 Drawing Figures

ARRANGEMENT AND PROCESS FOR MEASURING THE REFRACTIVE INDEX OF LIQUIDS

An arrangement for measuring the refractive index of liquids.

This invention relates to a two-beam arrangement for measuring the refractive index of liquids. The invention uses the fact that the intensity of a light beam reflected at the interface between a solid reference body whose refractive index is known and a sample liquid is governed by the refractive index of the measuring liquid when the angle of incidence of the light beam striking the interface is smaller than the critical angle of total reflection.

Arrangements of this kind have the advantage of being relatively insensitive to hazing or clouding of the sample liquid because the light beam to be measured does not pass through the sample liquid but is only reflected at the interface between the sample liquid and the reference body. Since the reflected intensity changes drastically with the refractive index of the sample liquid when the angle of incidence is only slightly smaller than the critical angle of total reflection, in accordance with Fresnel's formulae, it is possible to obtain high levels of sensitivity.

More recently different refractometers operating on this principle have become known. One feature common to all of them is that they comprise a suitably shaped reference body, usually of glass, with one surface in contact with the sample liquid at which a light beam is refracted and reflected. The intensity of the reflected component is measured with a photocell. Greater accuracy and greater reliability are obtained with a two-beam process, in which the primary light beam is split up into a measuring beam and a comparison beam. As in the aforementioned arrangements, the measuring beam is reflected at the interface of the reference body and the sample liquid. The comparison beam passes through a similar arrangement consisting of a second reference body with a comparison liquid adjoining it. The intensities of the reflected components of the measuring beam and the comparison beam are compared with one another by means of a photocell.

In one arrangement of this kind, for example that shown in Auslegeschrift No. 1,177,847, the reference bodies for the measuring and comparison beams consist of glass rotationally symmetrical bodies whose head ends are conical while their cylindrical surfaces are surrounded by liquid. Axially parallel light beams pass through the glass bodies in such a way that all the component beams are reflected at the same angle at the particular cylindrical surface and leave the glass bodies again in an axially parallel fashion. In this arrangement, the difference in the reflected intensities of the measuring beam and the comparison beam are measured by means of a photocell. The arrangement is sensitive to fluctuations in the sensitivity of the photocell. Fluctuations in the intensity of the light source are also fully included in the measurement.

In another apparatus described in Auslegeschrift No. 1,233,618 the reference bodies for the measuring and comparison beam are in the form of semi-cylinders whose plane surfaces adjoin the sample and comparison liquids. Light is partly reflected at the interface is focussed by means of a lens in front of the particular semi-cylinder on to the surface of the semi-cylinder and from there is reflected back into itself because the surface of the semi-cylinder has a reflecting coating. The reflected components of the measuring beam and comparison beam strike a photocell. The quotient of the reflected intensities of measuring beam and comparison beam is measured in this arrangement by means of a suitable electric circuit, so that fluctuations in the intensity of the light source are largely eliminated.

However, in regard to the accuracy and reproducibility of measurement, the arrangements described above have the serious disadvantage that the measuring and comparison beams are reflected at two different interfaces of two reference bodies. In either case, a second optical phase boundary is required for the comparison beam. In most cases, it is formed by a comparison liquid adjoining the second reference body. Dust particles or air bubbles at the second phase boundary, just like scattered light, can falsify measurement. Since the refractive index is usually governed to a considerable extent by temperature, the reflecting interfaces have to be arranged in a thermostat for accurate measurements. It is technically difficult to provide thermostatic control in the measuring and comparison beam paths. Transition from one temperature to another is usually accompanied by an error in measurement, even with effective thermostatic control, when the effect of temperature on the refractive indices of measuring and comparison liquid is not the same in each case.

In cases where an incandescent lamp is used as light source, the two liquids have to be adapted to one another in regard to their dispersion $n=n(\lambda)$ when measurement is to be carried out at different wave lengths this also applies when white light is used, as fluctuations in voltage in the incandescent lamp are accompanied not only by the change in intensity but also by a change in the spectral composition of the light. Accordingly, the requirements discussed in the foregoing leave very little room for choice in respect of the comparison liquid.

An object of the invention is to provide a simple highly sensitive and readily thermostatised two-beam refractometer which allows accurate and reproducible measurements within a wide measuring range. The disadvantages referred to above are intended to be obviated.

According to the invention, this object is achieved by virtue of the fact that the measuring beam and comparison beam are reflected at the same point along an interface between sample liquid and reference body, the angle of incidence $\alpha_M$ of the measuring beam being smaller and the angle of incidence $\alpha_V$ of the comparison beam greater than the critical angle of the total reflection.

Advantageously, the measuring beam and comparison beam are focussed through a lens on to one point of the interface between the reference body and the sample liquid.

The primary beam coming from the light source is split up by means of a double diaphragm into a measuring beam and a comparison beam and both beams are periodically let through and screened off in phase opposition by means of a rotating sector diaphragm as known per se.

The intensities of the measuring beam and the comparison beam are converted by means of a photocell into electrical signals which are then fed in known manner to a difference- and quotient-forming amplifier.

According to another aspect of the invention, a light-dimming device known per se controlled by the differential signal generated from the measuring and comparison beams is arranged in the beam path of the comparison beam. In this way, the reflected light intensities of measuring beam and comparison beam are automatically adjusted.

To vary sensitivity and the measuring range, the reference body with the pedestal and the receiving device is pivotal about an axis running perpendicularly of the incidence plane.

The particular advantage of this arrangement over known arrangements is that there is no need for a second reference body with comparison liquid. In this way, the arrangement is made much simpler in construction, more reliable in operation and much easier to thermostatize. The advantage of the two-beam principle remains unaffected.

Figure 2:
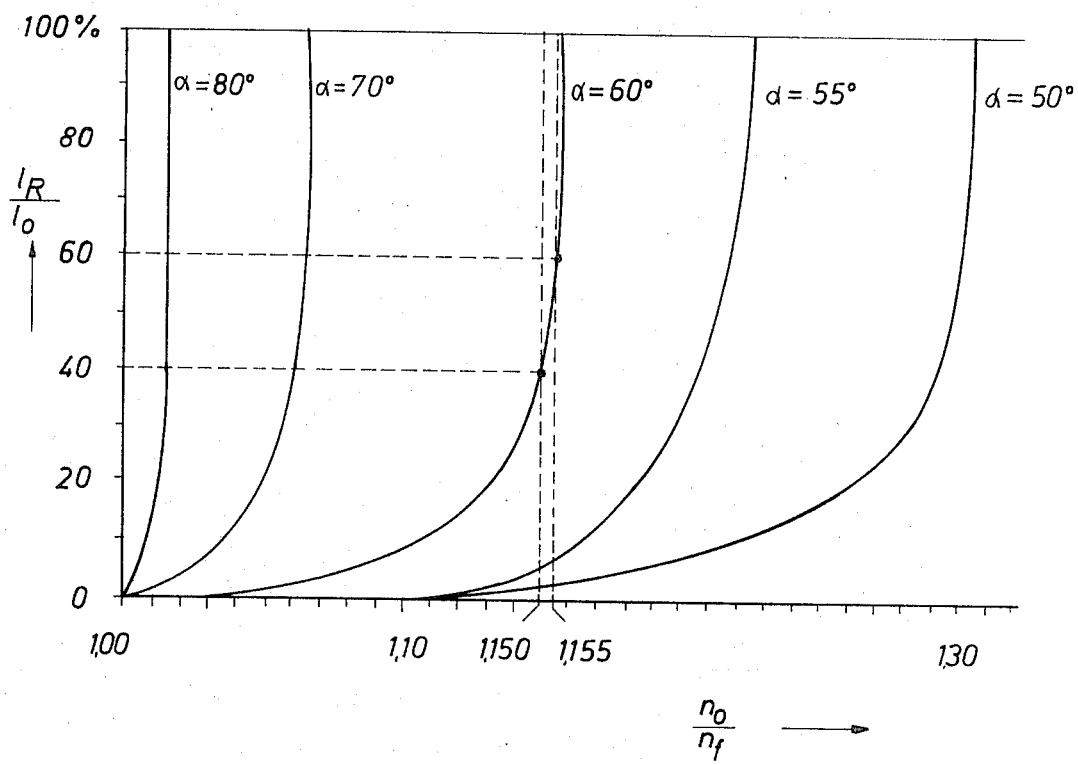

The arrangement according to the invention and its operation are discussed in the following with reference to the accompanying drawings, wherein FIG. 1 shows the optical beam path and a schema of the principle way the measured electrical value is processed, and FIG. 2 is a graph illustrating the Fresnel formula.

Two light beams 2 and 3 emanating from a light source 1 and produced by a double diaphragm 4 in the radiation cone of the light source are focussed through a lens 5 on to an interface between a reference body 6 and sample liquid 7. The reference body is a semi-cylinder or hemisphere so that all light beams directed on to the focussing point 9 enter the reference body perpendicularly. The angle of incidence $\alpha_M$ of the measuring beam 3 is smaller and the angle of incidence $\alpha_1$ of the comparison beam 2 greater than the critical angle of total reflection. Under these conditions, the reflected light intensity of the measuring beam 3 is governed by the ratio of the refractive index of the reference body to the refractive index of the sample liquid, while the comparison beam 2 is fully reflected. This follows from the Fresnel equations shown graphically in FIG. 2. Assuming the ratio of refractive indices is 1.155 for example, and the angle of incidence of the measuring beam is 60° and that of the comparison beam 70°, approximately 60 percent of the intensity of the incident measuring beam is reflected at the interface while the reflection of the comparison beam at the interface is complete. If the refractive index of the measuring liquid changes for example by an amount such that the ratio of the two refractive indices becomes 1.150, only 40 percent of the intensity of the incidence measuring beam is reflected at the interface, while the reflected light intensity of the comparison beam is still 100 percent.

The light beams reflected at point 9 emerge perpendicularly to the surface of the reference body 6 and are focussed through a lens 10 on to a photocell 11. Between the photocell and the lens there is a diffusion element for uniformly lighting the photocell. A rotating diaphragm wheel 13 periodically and alternately passes the measuring and comparison beams. The voltage pulses falling across the working resistance 14 of the photocell are fed to an amplifier 15 and separated in known manner into measuring and comparison signals. The difference or quotient of the two signals is formed in 16 and shown on an indicator 17.

A light-dimming device 18 of known type can be arranged in the path of the comparison beam 2. By means of this device, the light intensities of the measuring and comparison beam reflected at the interface can be made equal. The light-dimming device is also controlled for automatically regulating the differential signal at the output of the amplifier 15.

If it is not intended to use the entire spectrum of the light source for measurement, an optical filter can be arranged in the beam path between the light source 1 and the double diaphragm 4 for screening out a narrow wave length region.

FIG. 2 shows that a certain range of values for the incidence angle of the measuring beam and comparison beam is associated with each predetermined measuring range. The permissible range of values for the incidence angle of the measuring beam is limited by the fact that one end of the curve for the corresponding incidence angle is too flat and at the other end the critical angle of total reflection is exceeded. The choice of a suitable incidence angle depending upon the sensitivity required and the required measuring range can be made within the intervening range of values. The angle of incidence of the comparison beam must always be large enough for total reflection to be ensured over the entire measuring range.

The arrangement can be adapted to different measuring ranges by turning the reference body 6 with the pedestal 8 and the receiving device 10, 11, 12 about the focussing point 9.

Since, as shown in FIG. 2, the curves for greater angles of incidence become progressively steeper, the arrangement becomes more sensitive when the angle of incidence of the measuring beam is made greater, provided this angle does not actually exceeding the critical angle of total reflection. For a given measuring range the permissible angle of incidence can be increased by using another material with a smaller refractive index for the reference body 6.

We claim:

1. Apparatus for measuring the refractive index of liquids comprising:
    a. a specimen holder for the liquid including a chamber for the liquid and a solid body for disposing the liquid in interfacial contact with a surface of the solid body,
    b. light providing means for directing a measuring beam onto said interface at an angle of incidence less than the critical angle of total reflection for reflection from said interface of part of said beam in an amount depending on the refractive index of the sample liquid, and for directing a comparison beam onto said interface at an angle of incidence greater than the critical angle of total reflection for total reflection of the comparison beam from said interface,
    c. comparing means for comparing the intensities of the reflected measuring and comparison beams.
2. Apparatus according to claim 1, said light providing means directing the comparison and measuring beams onto the same point of said interface.
3. Apparatus according to claim 2, said light providing means comprising a light source, a double diaphragm for production of the measuring beam and comparison beam from light issuing from the light source, and a rotatable diaphragm wheel interposed between said double diaphragm and the specimen holder for alternate passage of the measuring beam and comparison beam to said interface.
4. Apparatus according to claim 3, and a lens for focusing the measuring beam and the comparison beam on the same point of said interface.
5. Apparatus according to claim 4, said comparison means comprising a photocell for alternately converting the reflected measuring and comparison beams into electrical signals, and means for comparing the respective electrical signals.
6. Apparatus as claimed in claim 5, and a light-dimming device controlled by a differential signal generated from the measuring beam and comparison beam arranged in the path of the comparison beam.
7. Apparatus according to claim 5, and means for pivoting the specimen holder for varying the angle of incidence of said beams.
8. Apparatus according to claim 1, and means for pivoting the specimen holder for varying the angle of incidence of said beams.
9. Apparatus according to claim 7, the solid body of the specimen holder being a hemisphere disposed for entrance thereinto of the measuring and comparison beams along radial lines thereof, for reflection from the interface.
10. Apparatus according to claim 1, the solid body of the specimen holder being a hemisphere disposed for entrance thereinto of the measuring and comparison beams along radial lines thereof, for reflection from the interface.
11. Process of measuring refractive index of liquids which comprises
    a. disposing the liquid in a specimen holder comprising a chamber for the liquid and a solid body for disposing the liquid in interfacial contact with a surface of the solid body,
    b. directing a measuring and a comparison beam through the specimen holder onto the interface of the liquid and solid body of the specimen holder, with light providing means for directing the measuring beam onto said interface at an angle of incidence less than the critical angle of total reflection for reflection from said interface of part of said beam in an amount depending on the refractive index of the sample liquid, and for directing the comparison beam onto said interface at an angle of incidence greater than the critical angle of total reflection for total reflection of the comparison beam from said interface,
    c. comparing the intensities of the respective reflected beams.
12. Process according to claim 11, and directing said measuring and comparison beams onto the same point of the interface.

* * * * *